(12) United States Patent
Park

(10) Patent No.: US 7,419,278 B2
(45) Date of Patent: Sep. 2, 2008

(54) LAMP GUIDE HOLDER, BACKLIGHT ASSEMBLY AND LIQUID CRYSTAL DISPLAY MODULE INCLUDING THE SAME

(75) Inventor: Sung-Yong Park, Gyeongbuk (KR)

(73) Assignee: LG. Display Co., Ltd, Seoul (KR)

( * ) Notice: Subject to any disclaimer, the term of this patent is extended or adjusted under 35 U.S.C. 154(b) by 0 days.

(21) Appl. No.: 11/517,774

(22) Filed: Sep. 8, 2006

(65) Prior Publication Data
US 2007/0053171 A1    Mar. 8, 2007

(30) Foreign Application Priority Data
Sep. 8, 2005    (KR) ...................... 10-2005-0083595

(51) Int. Cl.
F21S 4/00    (2006.01)
(52) U.S. Cl. ...................... 362/225; 362/224; 362/223; 362/217
(58) Field of Classification Search ......... 362/632–634, 362/217, 223, 225, 218, 260, 396, 561, 581, 362/457, 29–30, 458, 224
See application file for complete search history.

(56) References Cited

U.S. PATENT DOCUMENTS

2004/0012971 A1 * 1/2004 Tsai et al. ................... 362/390
2005/0073858 A1   4/2005 Kim et al.
2006/0007707 A1 * 1/2006 Lee et al. .................... 362/632
2006/0039163 A1 * 2/2006 Yun ........................... 362/600
2007/0091589 A1 * 4/2007 Choi et al. .................... 362/97
2007/0127272 A1 * 6/2007 Yang et al. .................. 362/634

FOREIGN PATENT DOCUMENTS

CN           1521546        8/2004
JP         2004-199008      7/2004

OTHER PUBLICATIONS

Notification of Office Action for corresponding Chinese Patent Application Serial No. 200610129028.0, dated Nov. 16, 2007.
Office Action issued in corresponding Chinese Patent Application No. 200610129028.0; issued Apr. 25, 2008.

* cited by examiner

Primary Examiner—John A. Ward
Assistant Examiner—Robert May
(74) Attorney, Agent, or Firm—Brinks Hofer Gilson & Lione

(57) ABSTRACT

A lamp guide holder includes a horizontal part that has a front surface and a rear surface, a fixing part that extends from the rear surface, and at least one lamp holding part on the front surface and having a ring shape. The lamp holding part has at least one protrusion on an inner surface thereof. The lamp guide holder further comprises a supporting part that extends from the front surface.

13 Claims, 5 Drawing Sheets

LAMP GUIDE HOLDER, BACKLIGHT ASSEMBLY AND LIQUID CRYSTAL DISPLAY MODULE INCLUDING THE SAME

This application claims the benefit of Korean Patent Application No. 2005-0083595, filed on Sep. 8, 2005, which is hereby incorporated by reference in its entirety.

FIELD

The present invention relates to a liquid crystal display (LCD) device, and more particularly, to a lamp guide holder, a backlight assembly and a liquid crystal display module including the lamp guide holder.

BACKGROUND

As the information age advances, display devices for displaying information are actively being developed. More particularly, flat panel display (FPD) devices having a thin profile, light weight and low power consumption are actively being pursued to substitute cathode ray tube (CRT) devices. For example, a liquid crystal display (LCD) device, a plasma display panel (PDP), a field emission display (FED) device and an electroluminescent display (ELD) device have been researched and developed as an FPD device. Specifically, liquid crystal display (LCD) devices are widely used as monitors for notebook computers and desktop computers because of their high resolution, high contrast ratio, color rendering capability and superiority in displaying moving images.

A liquid crystal display (LCD) device relies on optical anisotropy and polarizability of liquid crystal molecules to produce an image. Due to the optical anisotropy of liquid crystal molecules, refraction of light incident onto the liquid crystal molecules depends on the alignment direction of the liquid crystal molecules. Liquid crystal molecules are aligned with directional characteristics resulting from their long, thin shapes. The alignment direction of the liquid crystal molecules can be controlled by applying an electric field thereto.

A liquid crystal display (LCD) module includes a liquid crystal display (LCD) panel having two substrates and a liquid crystal layer interposed therebetween and a backlight assembly supplying light to the LCD panel. The liquid crystal molecules are aligned according to the direction of an electric field generated between electrodes disposed on both substrates of the LCD panel. By refracting and transmitting incident light and controlling the electric field applied to a group of liquid crystal molecules within particular pixel regions, a desired image can be obtained. However, because an LCD panel does not emit light, an LCD module requires an additional light source. Accordingly, an LCD module includes a backlight assembly disposed below an LCD panel to supply light.

Of the different types of known liquid crystal display (LCD) devices, active matrix LCD (AM-LCD) devices, which have thin film transistors (TFTs) and pixel electrodes arranged in a matrix form, are the subject of significant research and development because of their high resolution and superior ability in displaying moving images. A cold cathode fluorescent lamp (CCFL) or an external electrode fluorescent lamp (EEFL) may be used as a light source of a backlight assembly.

In general, backlight assemblies may be classified into two types according to a disposition of the light source, such as a side-type and a direct-type. In a side-type backlight unit, a light guide plate (LGP) is disposed at a rear of an LCD panel and a light source is disposed at a side of the LGP. Light emitted from the light source is refracted in the LGP and is supplied to the LCD panel. In a direct-type backlight unit, a plurality of light sources are disposed at a rear of an LCD panel, and light emitted from the plurality of light sources is directly supplied to the LCD panel.

FIG. 1 is schematic cross-sectional view showing a liquid crystal display module using a direct-type backlight assembly according to the related art. In FIG. 1, an LCD panel 10 and a backlight assembly 20 are integrated in an LCD module by mechanical elements. Accordingly, the LCD module includes an LCD panel 10, a backlight assembly 20, a main frame 30, a top frame 40 and a bottom frame 50. The LCD panel 10 is disposed over the backlight assembly 20, and the main frame surrounds side surfaces of the LCD panel 10 and the backlight assembly 20. The top frame 40 surrounds a front edge surface of the LCD panel 10, and the bottom frame 50 wraps a rear surface of the backlight assembly 20. The top frame 40 and the bottom frame 50 are combined through the main frame 30.

The LCD panel 10 includes a first substrate 12, a second substrate 14 and a liquid crystal layer between the first and second substrates 12 and 14. Although not shown in FIG. 1, a driving circuit is connected to a side of the LCD panel 10 and is bent toward a rear of the LCD panel 10. The backlight assembly 20 includes a reflecting sheet 22, a plurality of fluorescent lamps 24 and an optic sheet 26. The reflecting sheet 22 has a white color or a silver color and is disposed over the bottom frame 50. The plurality of fluorescent lamps 24 are parallel arranged over the reflecting sheet 22, and the optic sheet 26 covers the plurality of fluorescent lamps 24. In addition, the optic sheet 26 may include a prism sheet and a diffusing sheet. As a result, lights emitted from the plurality of fluorescent lamps 24 and reflecting on the reflecting sheet 22 are supplied to the LCD panel 10 through the optic sheet 26. The brightness of the lights becomes uniform while passing through the optic sheet 26.

The backlight assembly 20 is optically designed to supply a uniform plane light having high quality to the LCD panel 10. One of the factors for the uniform light is to keep a distance "a" between the plurality of fluorescent lamps 24 and the optic sheet 26. When the distance "a" is too small, a linear light having a stripe shape reflecting the shape of each fluorescent lamps 24 is supplied to the LCD panel 10. In addition, when the distance "a" is too great, the brightness of the light is reduced. Accordingly, the distance "a" should be exactly controlled. Moreover, sizes of each fluorescent lamp 24 and the optic sheet 26 increase according to the increase of a display device in a size. As a result, a large-sized optic sheet may be partially sunk, and it is hard to keep the distance uniform in a large-sized LCD module.

To solve the above problems, an additional means adjusting the distance has been suggested. A rubber ring may be disposed on an outer surface of a portion of each fluorescent lamp 24 to adjust the distance. As sizes of each fluorescent lamp 24 and the optic sheet 26 increase, the distance between each fluorescent lamp 24 and the optic sheet 26 increases and the thickness and the width of the rubber ring increase. However, as the width of the rubber ring increases, the portion of each fluorescent lamp 24 that is blocked by the rubber ring is enlarged and light loss increases. As a result, the brightness is reduced at the blocked portion and non-uniformity in brightness is caused.

Recently, a lamp guide holder is used to keep the distance between the fluorescent lamp and the optic sheet uniform. In addition, the lamp guide holder prevents sway and break of the fluorescent lamp.

FIG. 2 is a schematic cross-sectional view showing a backlight assembly according to the related art. In FIG. 2, a reflecting sheet 22 and a lamp guide holder 60 are sequentially disposed over a bottom frame 50, and an optic sheet 26 is disposed over the lamp guide holder 60. The lamp guide holder 60 includes a horizontal part 62, a fixing part 64, a pair of lamp holding parts 66 and a supporting part 68. The fixing part 64 downwardly extends from a rear surface of the horizontal part 62, and the pair of lamp holding parts 66 is formed on a front surface of the horizontal part 62. The fixing part 64 passes through the bottom frame 50 to fix the lamp guide holder 60. Each lamp holding parts 66 has a ring shape having an open portion, and two adjacent fluorescent lamps 24 are inserted into the pair of lamp holding parts 66. The supporting part 68 having a cone shape upwardly extends from the front surface of the horizontal part 62 at a central portion. The supporting part 68 supports the optic sheet 26. The distance between the fluorescent lamp 24 and the optic sheet 26 is kept uniform by the lamp guide holder 60. In addition, the fluorescent lamp 24 is fixed to the pair of lamp holding parts 66 with a predetermined distance from the reflecting sheet 22. As a result, the possibility of sway and break of the fluorescent lamp is reduced.

However, since the pair of lamp holding parts 66 directly contacts the outer surface of the fluorescent lamp 24, the emission region of the fluorescent lamp 24 is partially blocked. The block of the emission region causes light loss and reduction of brightness.

FIG. 3 is a schematic plane view showing a brightness distribution in a backlight assembly having a lamp guide holder according to the related art. In FIG. 3, stains "B" having a relatively low brightness are inspected at a position corresponding to the lamp guide holder 60 (of FIG. 2).

SUMMARY

A lamp guide holder includes a horizontal part that has a font surface and a rear surface, and a fixing part that extends from the rear surface. The lamp guide holder further comprises at least one lamp holding part on the front surface and having a ring shape. The at least one lamp holding part has at least one protrusion on an inner surface thereof. The lamp guide holder also comprises a supporting part that extends from the front surface.

In another aspect, a backlight assembly including a lamp guide holder comprises a horizontal part that has a font surface and a rear surface, and a fixing part that extends from the rear surface. The backlight assembly including a lamp guide holder further comprises at least one lamp holding part on the front surface and having a ring shape. The at least one lamp holding part has at least one protrusion on an inner surface thereof. The backlight assembly including a lamp guide holder also comprises a supporting part that extends from the front surface, and a reflecting sheet under the horizontal part. The fixing part passes through the reflecting sheet. The backlight assembly including a lamp guide holder further includes a fluorescent lamp inserted into the at least one lamp holding part, and an optic sheet that contacts the supporting part.

In another aspect, a liquid crystal display module including a lamp guide holder includes a horizontal part that has a font surface and a rear surface, a fixing part that extends from the rear surface, and at least one lamp holding part on the front surface and having a ring shape. The at least one lamp holding part has at least one protrusion on an inner surface thereof. The liquid crystal display module including a lamp guide holder further comprises a supporting part that extends from the front surface, and a reflecting sheet under the horizontal part. The fixing part passes through the reflecting sheet. The liquid crystal display module including a lamp guide holder also includes a fluorescent lamp inserted into the at least one lamp holding part, an optic sheet that contacts the supporting part, a liquid crystal display panel over the optic sheet, and a main frame that surrounds a side surface of the liquid crystal display panel. The liquid crystal display module including a lamp guide holder further comprises a bottom frame that wraps a rear surface of the reflecting sheet, wherein the fixing part passes through the bottom frame, and a top frame that surrounds a front edge surface of the liquid crystal display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the preferred embodiments of the present invention, examples of which are illustrated in the accompanying drawings. Wherever possible, similar reference numbers will be used to refer to the same or similar parts.

Figure 1:
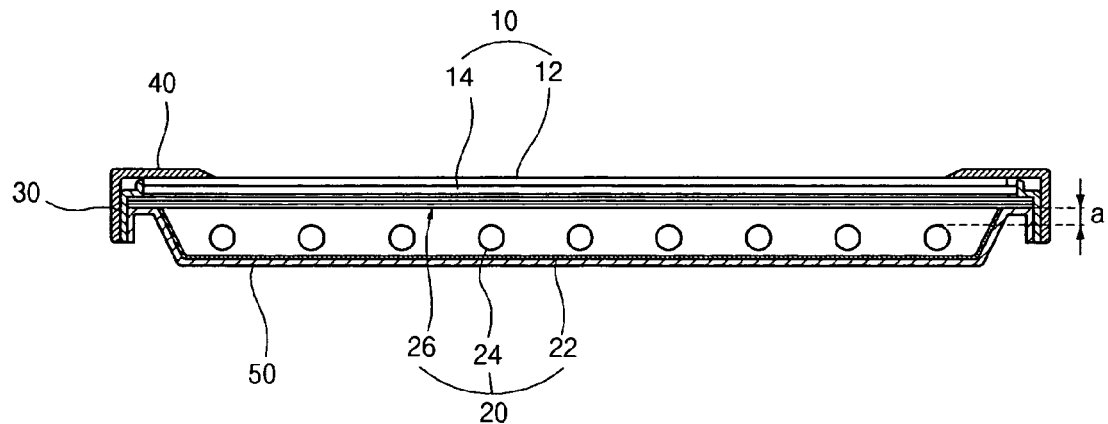
FIG. 1 is schematic cross-sectional view showing a liquid crystal display module using a direct-type backlight assembly according to the related art.
Figure 2:
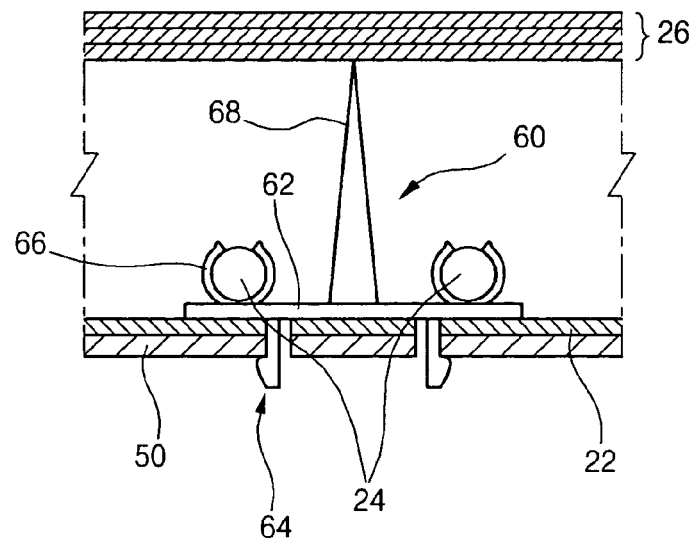
FIG. 2 is a schematic cross-sectional view showing a backlight assembly according to the related art.
Figure 3:
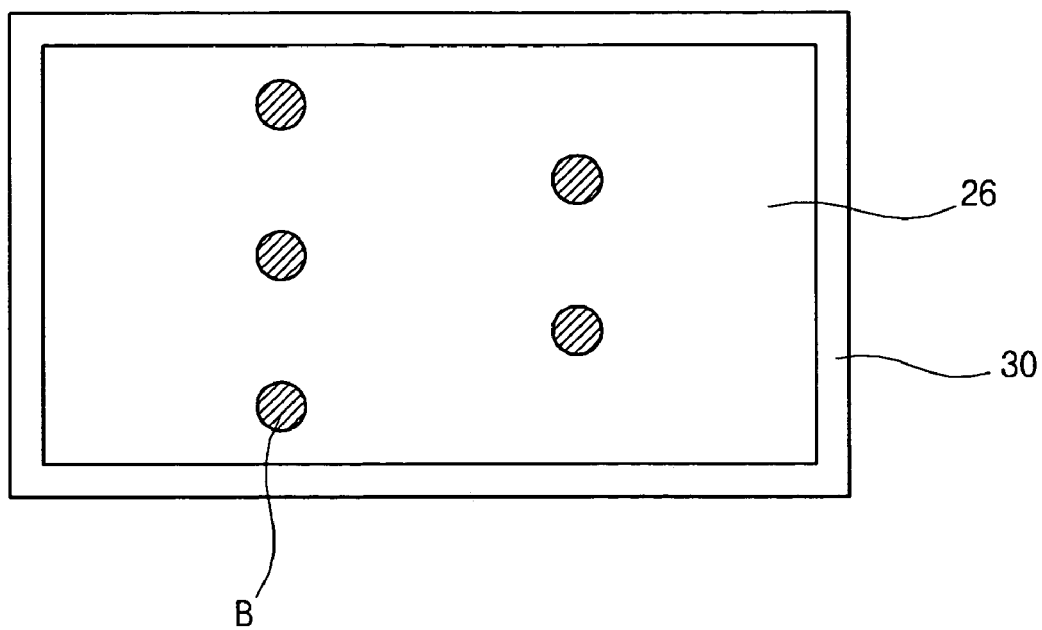
FIG. 3 is a schematic plane view showing a brightness distribution in a backlight assembly having a lamp guide holder according to the related art.
Figure 4:
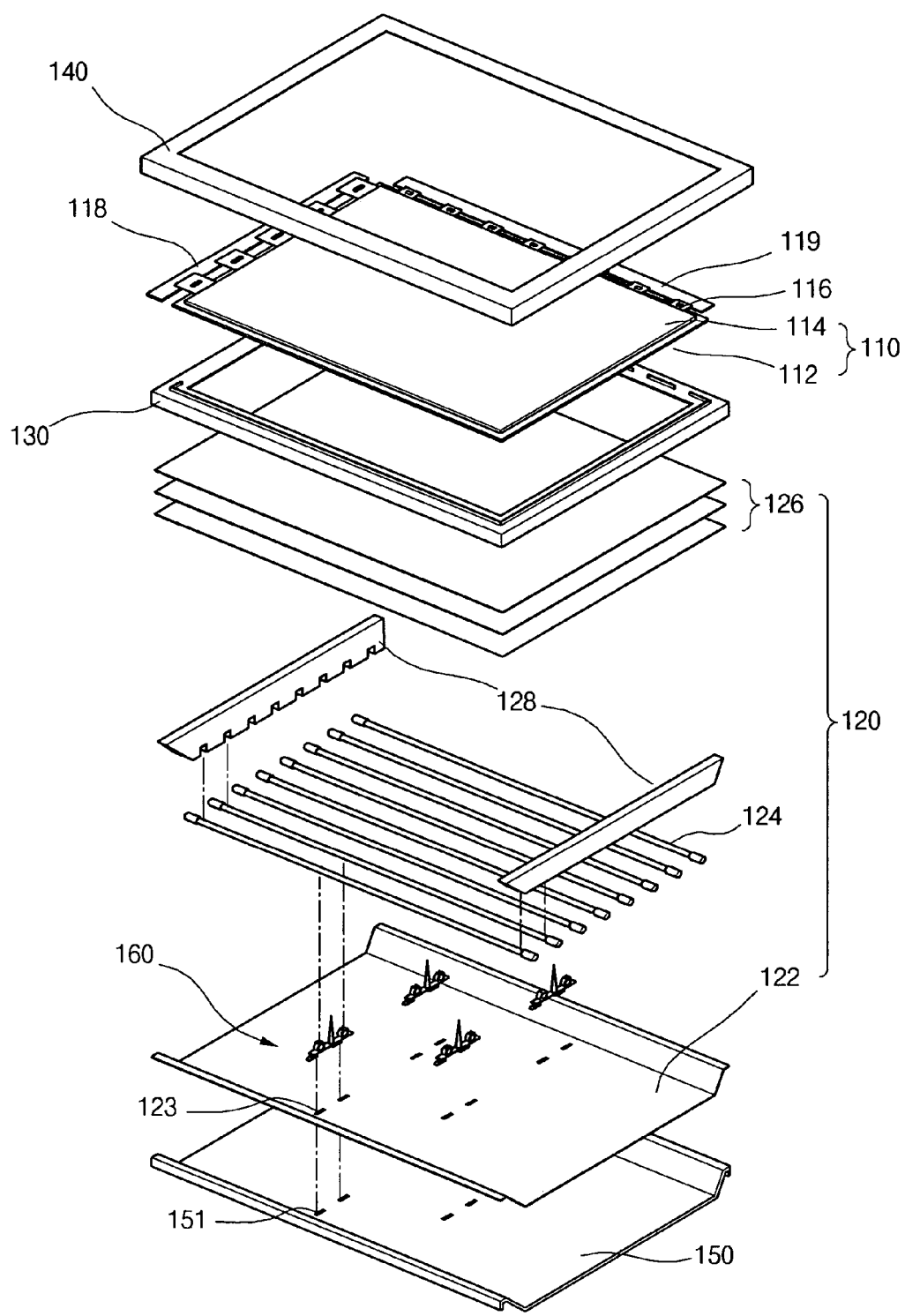
FIG. 4 is a schematic exploded perspective view showing a liquid crystal display module according to an embodiment of the present invention.

FIG. 4 is a schematic exploded perspective view showing a liquid crystal display module according to an embodiment of the present invention.

In FIG. 4, a liquid crystal display (LCD) module includes a liquid crystal display (LCD) panel 110, a backlight assembly 120, a main frame 130, a top frame 140 and a bottom frame 150. The LCD panel 110 is disposed over the backlight assembly 120, and the main frame surrounds side surfaces of the LCD panel 110 and the backlight assembly 120. The top frame 40 surrounds a front edge surface of the LCD panel 110, and the bottom frame 150 wraps a rear surface of the backlight assembly 120. The top frame 140 and the bottom frame 150 are combined through the main frame 130.

The LCD panel 110 includes a first substrate 112, a second substrate 114 and a liquid crystal layer (not shown) between the first and second substrates 112 and 114. Although not shown in FIG. 4, a gate line and a data line are formed on an inner surface of the first substrate 112, which is referred to as a lower substrate or an array substrate. The gate line crosses the data line to define a pixel region, and a thin film transistor (TFT) is connected to the gate line and the data line. A pixel electrode connected to the TFT is formed in the pixel region. In addition, a black matrix and a color filter layer are formed on an inner surface of the second substrate 114, which is referred to as an upper substrate or a color filter substrate. The black matrix corresponds to the gate line, the data line and the TFT. The color filter layer includes red, green and blue color filters each corresponding to the pixel region. A common electrode is formed on the black matrix and the color filter layer.

A driving circuit is connected to at least one side of the LCD panel 110 through a tape carrier package (TCP) or a flexible printed circuit board (FPC). The driving circuit is bent toward a side surface of the main frame 130 or a rear surface of the bottom frame 150. In addition, the driving circuit may include a gate driving circuit 118 and a data driving circuit 119 connected to two adjacent sides of the LCD panel 110. The gate driving circuit 118 sequentially applies an on/off signal for the TFT to the gate line, and the data driving circuit 119 applies an image signal to the data line in each frame. Accordingly, when the TFT connected to the gate line is turned on by the on/off signal of the gate driving circuit 118, the image signal of the data driving circuit 119 is supplied to the pixel electrode. The liquid crystal layer is rearranged by the electric field generated between the pixel electrode and the common electrode, and the transmittance of the liquid crystal layer is adjusted.

The backlight assembly 120 under the LCD panel 110 supplies light to the LCD panel 110. The backlight assembly 120 includes a reflecting sheet 122, a plurality of fluorescent lamps 124, a pair of side supporters 128 and an optic sheet 126. The reflecting sheet 22 has a white color or a silver color and covers an inner surface of the bottom frame 150. The plurality of fluorescent lamps 124 are parallel arranged over the reflecting sheet 122, and the pair of side supporters 128 fixes the plurality of fluorescent lamps 124 to the bottom frame 150. The optic sheet 126 is disposed over the plurality of fluorescent lamps 124 and may include a prism sheet and a diffusing sheet. As a result, lights emitted from the plurality of fluorescent lamps 124 and reflecting on the reflecting sheet 122 are supplied to the LCD panel 110 through the optic sheet 126. The brightness of the lights becomes uniform while passing through the optic sheet 126.

In the LCD module of FIG. 4, the plurality of fluorescent lamps 124 is fixed to the bottom frame 150 with a predetermined height from the reflecting sheet 122 using a lamp guide holder 160 as an additional fixing means, thereby maximizing reflection efficiency. Further, the first distance between the optic sheet 126 and each fluorescent lamp 124 is kept uniform by the lamp guide holder 160, thereby generating a uniform plane light.

Figure 5A:
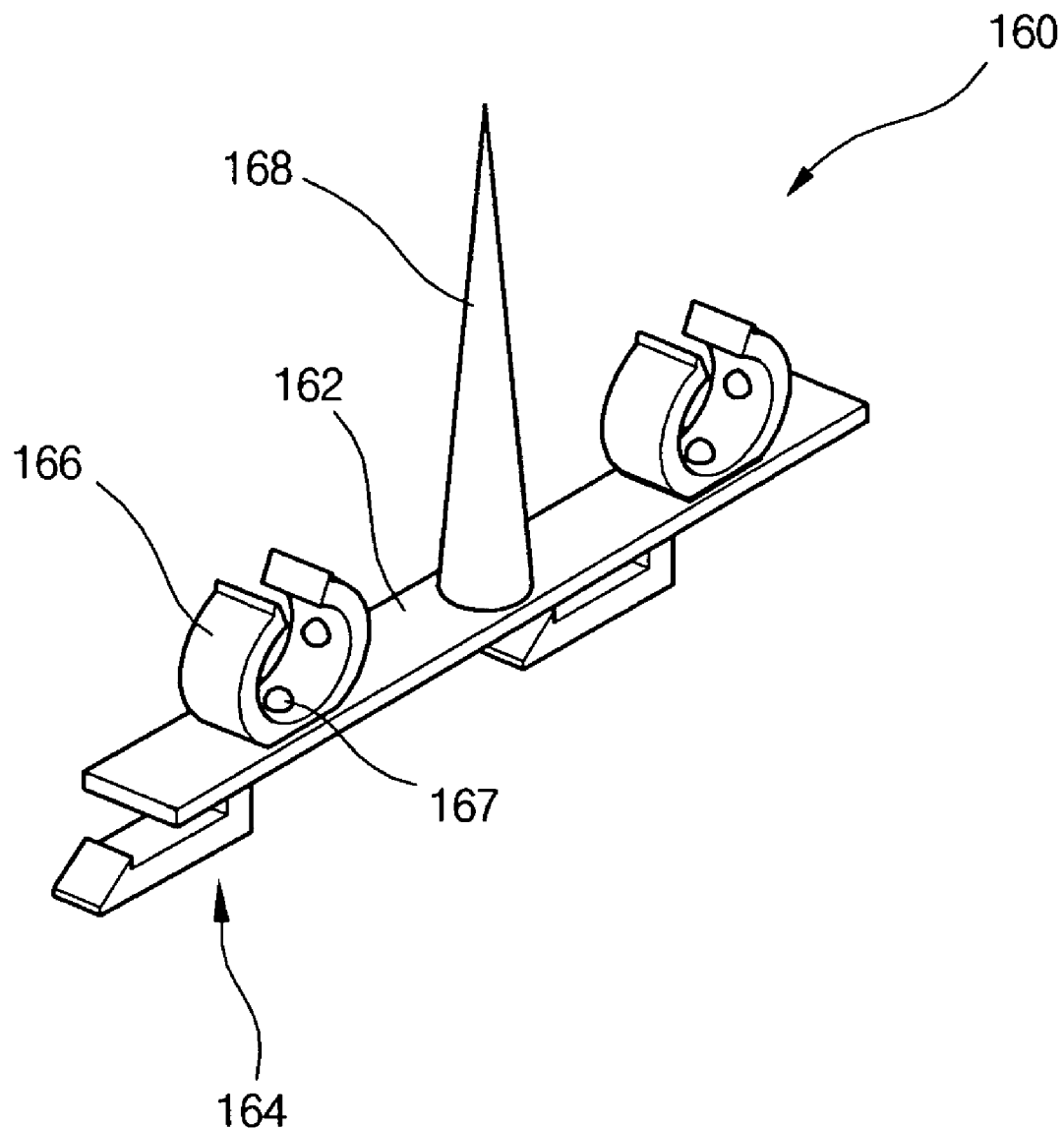
FIGS. 5A and 5B are a schematic perspective view and a schematic front view, respectively, showing a lamp guide holder according to an embodiment of the present invention.
Figure 5B:
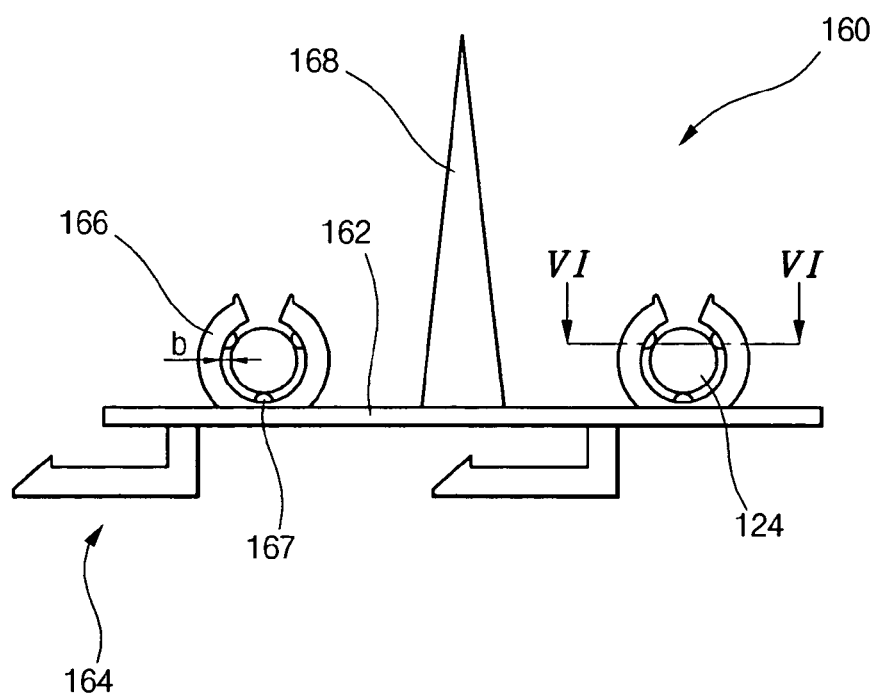

FIGS. 5A and 5B are a schematic perspective view and a schematic front view, respectively, showing a lamp guide holder according to an embodiment of the present invention.

As shown in FIGS. 4, 5A and 5B, the lamp guide holder 160 includes a horizontal part 162, a fixing part 164, at least one lamp holding part 166 and a supporting part 168. The lamp guide holder 160 may include a synthetic resin of a white color or a silver color and have a relatively high reflection efficiency. The horizontal part 162 has a plate shape having one of a polygon or a circle in plane view. The horizontal part 162 is disposed over the reflecting sheet 122 and functions as a main body of the lamp guide holder 160 supporting the optic sheet 126.

The supporting part 168 upwardly extends from a front surface of the horizontal part 162 at a central portion and may have a cone shape. The supporting part 168 directly contacts and supports the optic sheet 126. As a result, a first distance between the fluorescent lamp 124 and the optic sheet 126 is kept uniform by the lamp guide holder 160.

The at least one lamp holding part 166 is formed on the front surface of the horizontal part 162. For example, the at least one lamp holding part 166 may be disposed at two symmetrical positions of the horizontal part 162. The at least one lamp holding part 166 has a ring shape having an open portion and partially wrapping an outer surface of the fluorescent lamp 124. For example, the open portion may be formed to face the optic sheet 126 and be disposed opposite to the horizontal part 162. The fluorescent lamp 124 may be inserted into the at least one lamp holding part 166 through the open portion to be fixed to the at least one lamp holding part 166. Specifically, at least one protrusion 167 is formed on an inner surface of the at least one lamp holding part 166. Accordingly, the outer surface of the fluorescent lamp 124 substantially contacts an end portion of the at least one protrusion 167 on the inner surface of the at least one lamp holding part 166. In addition, two adjacent fluorescent lamps 124 may be inserted into and fixed to the at least one lamp holding part 166. As a result, the possibility of sway and break of the fluorescent lamp 124 is reduced.

The fixing part 164 downwardly extends from a rear surface of the horizontal part 162. The fixing part 164 passes through the bottom frame 150 to fix the lamp guide holder 160. For example, the fixing part 164 may be disposed at two symmetrical positions of the horizontal part 162. In addition, the fixing part 164 may have an L shape that extends from the horizontal part 162 and is bent. A hook may be formed at an end of the fixing part 164. The reflecting sheet 122 and the bottom frame 150 have first and second through holes 123 and 151, respectively, corresponding to the fixing part 164.

Since the fluorescent lamp 124 is fixed to at least one lamp holding part 166 of the lamp guide holder 160 with a uniform predetermined height from the reflecting sheet 122, the reflection efficiency is improved and the possibility of sway and break of the fluorescent lamp 124 is reduced. Moreover, since the optic sheet 126 is supported by the supporting part 168 of the lamp guide holder 160, the partial sinkage of the optic sheet 126 due to its weight is prevented and the first distance between the fluorescent lamp 124 and the optic sheet 126 is kept uniform.

Furthermore, since the at least one protrusion 167 is formed on the inner surface of the at least one lamp holding part 166 of the lamp guide holder 160, the outer surface of the fluorescent lamp 124 is separated from the inner surface of the at least one lamp holding part 166 by a second distance "b." Accordingly, the blocked region of the fluorescent lamp 124 by the at least one lamp holding part 166 is minimized and the light loss is reduced.

Figure 6:
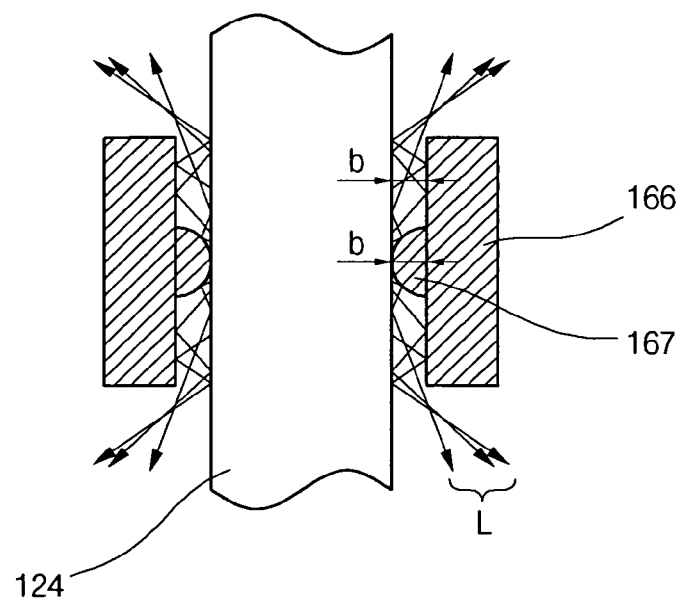
FIG. 6 is a cross-sectional view taken along a line "VI-VI" of FIG. 5B.

FIG. 6 is a cross-sectional view taken along a line "VI-VI" of FIG. 5B.

In FIG. 6, the inner surface of the at least one lamp holding part 166 is separated from the outer surface of the fluorescent lamp 124 by the second distance "b" corresponding to the height of the at least one protrusion 167. Since the inner surface of the lamp holding part 166 and the outer surface of the fluorescent lamp 124 have a relatively high reflection efficiency, light emitted from a region wrapped by the at least one lamp holding part 166 repeatedly reflects between the inner surface of the at least one lamp holding part 166 and the outer surface of the fluorescent lamp 124. The reflected light "L" is finally emitted out of the at least one lamp holding part 166. As a result, the light loss of the backlight assembly of the present invention is reduced as compared with the light loss of the backlight assembly of the related art. The fluorescent lamp 124 has a blocked region corresponding to the contact area of the at least one protrusion 167 and the fluorescent lamp 124. When the at least one protrusion 167 has a hemispherical shape, the contact area of the at least one protrusion 167 and the fluorescent lamp 124 is minimized and the increase in the light efficiency is maximized. For example, the at least one protrusion 167 may be three protrusions or four protrusions on the basis of the light efficiency and the lamp support stability.

In the lamp guide holder 160 according to the present invention, since the at least one protrusion 167 is formed on the inner surface of the at least one lamp holding part 166, the contact area of the fluorescent lamp 124 and the at least one lamp holding part 166 is minimized. Since the at least one lamp holding part 166 is separated from the fluorescent lamp 124 by the second distance, the light loss is minimized. Accordingly, the shape of the lamp guide holder 160, specifically, the shapes of the fixing part and the supporting part may be changed in another embodiment.

In the backlight assembly and the liquid crystal module including the lamp guide holder according to the present invention, consequently, a uniform plane light is obtained by keeping the distance between the optic sheet and the fluorescent lamp uniform. Further, the possibility of sway and break of the fluorescent lamp due to the external impact is reduced. Moreover, the brightness is improved by minimizing the light loss due to the block of the fluorescent lamp.

It will be apparent to those skilled in the art that various modifications and variations can be made in the lamp guide holder, the backlight assembly and the liquid crystal display module including the same of the present invention without departing from the spirit or scope of the invention. Thus, it is intended that the present invention cover the modifications and variations of this invention provided they come within the scope of the appended claims and their equivalents.

What is claimed is:

1. A lamp guide holder, comprising:
   a horizontal part that has a front surface and a rear surface;
   a fixing part that extends from the rear surface;
   at least one lamp holding part on the front surface and having a ring shape, the at least one lamp holding part having at least one protrusion on an inner surface thereof and the at least one protrusion protruding from the inner surface of the at least one lamp holding part toward a center of the ring shape; and
   a supporting part that extends from the front surface.

2. The lamp guide holder according to claim 1, wherein the supporting part has a height greater than the at least one lamp holding part.

3. The lamp guide holder according to claim 1, wherein the at least one lamp holding part includes an open portion.

4. The lamp guide holder according to claim 3, wherein the open portion is disposed opposite to the horizontal part.

5. The lamp guide holder according to claim 1, wherein the at least one protrusion has a hemispherical shape.

6. The lamp guide holder according to claim 1, wherein the at least one lamp holding part includes a synthetic resin that has one of a white color and a silver color.

7. A backlight assembly including a lamp guide holder, comprising:
   a horizontal part that has a front surface and a rear surface;
   a fixing part that extends from the rear surface;
   at least one lamp holding part on the front surface and having a ring shape, the at least one lamp holding part having at least one protrusion on an inner surface thereof and the at least one protrusion protruding from the inner surface of the at least one lamp holding part toward a center of the ring shape;
   a supporting part that extends from the front surface;
   a reflecting sheet under the horizontal part, the fixing part passing through the reflecting sheet;
   a fluorescent lamp inserted into the at least one lamp holding part; and
   an optic sheet that contacts the supporting part.

8. A backlight assembly including a lamp guide holder, comprising:
   a horizontal part that has a front surface and a rear surface;
   a fixing part that extends from the rear surface;
   at least one lamp holding part on the front surface and having a ring shape, the at least one lamp holding part having at least one protrusion on an inner surface thereof;
   a supporting part that extends from the front surface;
   a reflecting sheet under the horizontal part, the fixing part passing through the reflecting sheet;
   a fluorescent lamp inserted into the at least one lamp holding part; and
   an optic sheet that contacts the supporting part;
   wherein the fluorescent lamp is separated from the at least one lamp holding part by the at least one protrusion.

9. The backlight assembly according to claim 7, wherein the fluorescent lamp contacts an end portion of the at least one protrusion.

10. The backlight assembly according to claim 7, wherein the optic sheet includes a diffusing sheet and a prism sheet.

11. The backlight assembly according to claim 7, wherein the reflecting sheet has a first through hole corresponding to the fixing part.

12. A liquid crystal display module including a lamp guide holder, comprising:
    a horizontal part that has a front surface and a rear surface;
    a fixing part that extends from the rear surface;
    at least one lamp holding part on the front surface and having a ring shape, the at least one lamp holding part having at least one protrusion on an inner surface thereof and the at least one protrusion protruding from the inner surface of the at least one lamp holding part toward a center of the ring shape;
    a supporting part that extends from the front surface;
    a reflecting sheet under the horizontal part, the fixing part passing through the reflecting sheet;
    a fluorescent lamp inserted into the at least one lamp holding part;
    an optic sheet that contacts the supporting part;
    a liquid crystal display panel over the optic sheet;
    a main frame that surrounds a side surface of the liquid crystal display panel;
    a bottom frame that wraps a rear surface of the reflecting sheet, the fixing part passing through the bottom frame; and
    a top frame that surrounds a front edge surface of the liquid crystal display panel.

13. The liquid crystal display module according to claim 12, wherein the reflecting sheet and the bottom frame include first and second through holes, respectively, corresponding to the fixing part.

* * * * *